United States Patent
Alizadeh-Shabdiz et al.

(10) Patent No.: US 10,902,025 B2
(45) Date of Patent: Jan. 26, 2021

(54) TECHNIQUES FOR MEASURING A PROPERTY OF INTEREST IN A DATASET OF LOCATION SAMPLES

(71) Applicant: Skyhook Wireless, Inc., Boston, MA (US)

(72) Inventors: Farshid Alizadeh-Shabdiz, Wayland, MA (US); Javier Velez, Cambridge, MA (US)

(73) Assignee: Skyhook Wireless, Inc., Boston, MA (US)

( * ) Notice: Subject to any disclaimer, the term of this patent is extended or adjusted under 35 U.S.C. 154(b) by 256 days.

(21) Appl. No.: 15/241,928

(22) Filed: Aug. 19, 2016

(65) Prior Publication Data

US 2017/0052960 A1    Feb. 23, 2017

Related U.S. Application Data

(60) Provisional application No. 62/207,669, filed on Aug. 20, 2015.

(51) Int. Cl.
*G06F 7/02* (2006.01)
*G06F 16/00* (2019.01)
*G06F 16/28* (2019.01)
*G06F 16/2457* (2019.01)

(52) U.S. Cl.
CPC ...... *G06F 16/285* (2019.01); *G06F 16/24578* (2019.01)

(58) Field of Classification Search
CPC ....... H04W 4/021; H04W 4/02; H04W 4/025; H04W 64/00; G06F 17/3053; G06F 17/30598; G06F 16/285; G06F 16/24578
See application file for complete search history.

(56) References Cited

U.S. PATENT DOCUMENTS

| | | | |
|---|---|---|---|
| 7,764,231 B1 * | 7/2010 | Karr | G01S 1/026 342/457 |
| 8,380,220 B2 * | 2/2013 | Alles | G01S 5/021 370/310.2 |
| 8,606,294 B2 | 12/2013 | Alizadeh-Shabdiz | |
| 2001/0022558 A1 * | 9/2001 | Karr, Jr. | G01S 1/026 342/450 |
| 2008/0188236 A1 * | 8/2008 | Alles | G01S 5/021 455/456.1 |

(Continued)

*Primary Examiner* — Bruce M Moser
(74) *Attorney, Agent, or Firm* — Cesari and McKenna, LLP; James A. Blanchette

(57) ABSTRACT

In one example embodiment, an analysis application implements a technique for measuring a property of interest of an input dataset of location samples. The analysis application may process the input dataset in one or more multi-stage pipelines to produce values that measure a metric for the input dataset. The values that measure the metric for the input dataset may be compared with values that measure the metric for one or more labeled datasets that are generated by the analysis application, for example, using a feedback loop and sampling from a plurality of delta data sets. Each labeled datasets may have different values that measure the metric and corresponding measures of the property of interest. Based on the comparison, the analysis application may determine the measure of the property of interest for the input dataset and such measure may be returned, for example, to a remote device.

20 Claims, 8 Drawing Sheets

(56) References Cited

U.S. PATENT DOCUMENTS

| | | |
|---|---|---|
| 2012/0331561 A1 | 12/2012 | Broadstone et al. |
| 2013/0086072 A1 | 4/2013 | Peng et al. |
| 2013/0340095 A1 | 12/2013 | Broadstone et al. |
| 2014/0009339 A1 | 1/2014 | Sutton et al. |
| 2015/0019738 A1 | 1/2015 | Alizadeh-Shabdiz et al. |
| 2015/0148057 A1* | 5/2015 | Pakzad ............ H04W 52/0261 455/456.1 |
| 2015/0319634 A1* | 11/2015 | Zwirn .................... G01S 11/02 370/252 |
| 2016/0021494 A1* | 1/2016 | Yang .................... H04W 4/029 455/41.2 |
| 2017/0034666 A1* | 2/2017 | Priness ................ H04W 64/00 |
| 2017/0276760 A1* | 9/2017 | Alsehly ................ G01S 5/0236 |
| 2019/0069270 A1* | 2/2019 | Edge .................... H04W 64/006 |
| 2019/0268715 A1* | 8/2019 | Stern .................... H04W 64/00 |

\* cited by examiner

TECHNIQUES FOR MEASURING A PROPERTY OF INTEREST IN A DATASET OF LOCATION SAMPLES

RELATED APPLICATIONS

This application claims the benefit of U.S. Provisional Patent Application No. 62/207,669, filed by Farshid Alizadeh-Shabdiz and Javier Velez on Aug. 20, 2015, titled "Techniques for Measuring a Property of Interest in a Dataset of Location Samples", the contents of which are incorporated by referenced herein in their entirety.

BACKGROUND

Technical Field

The present disclosure relates generally to analysis of datasets samples, and more specifically to computer-implemented techniques for measuring a property of interest in a dataset of location samples.

Background Information

Location-based data is becoming increasingly important in providing a variety of services to consumers. In addition to its use in estimating the current position of an individual electronic device belonging to the consumer (and thereby the consumer's current location), location-based data may be aggregated into datasets of location samples, which include samples for one or more devices collected potentially at multiple different times, and used to determine a variety of types of location-based statistical information (e.g., consumer demographic information, traffic information, or other types of valuable information). Datasets of location samples may be produced using any of a variety of location determination systems, or various combinations of location determination systems, including Wi-Fi positioning systems (WPS) that utilize signals (e.g., IEEE 802.11 signals) received from nearby Wi-Fi access points (APs), cellular positioning systems that utilize cellular signals received from nearby cell towers, or the global positioning system (GPS) that utilizes signals received from satellites, among other types of location determination systems. Each location sample of a dataset may include location information indicating an estimated location of an electronic device (and thereby its user). The estimated location may be defined in any of a variety of metric spaces with a known distance function (such as latitude, longitude pairs, Euclidean x, y, z coordinates, etc.). Each location sample of the dataset may, in some cases, also include grouping information. Grouping information may be any information that maps the location samples into sets of non-overlapping groups, with every location sample belonging to a set of groups, and with the potential presence of an un-grouped group. Common grouping information may include a user identifier (ID) or a device ID. Each location sample of the dataset may, in some cases, further include temporal information indicating a time for the estimated location. The temporal information may be a point in time, a time range or some other temporal indicator.

It is often desirable to measure a property of interest of a dataset of location samples. The property of interest may take any of a variety of forms. The property of interest may be related to the dataset as a whole, or may measure location samples within the dataset that have certain properties. For example, the property of interest may be quality of the dataset as a whole, or a measure of location samples within the dataset that are "good" or "bad" (e.g., measured as a ratio of "bad" samples to "good" samples, where "bad" and "good" are determined by comparison to a quality threshold). In still other alternatives, the property of interest may be diversity, entropy, information value, or another property of the dataset as a whole, or a measure of location samples which have low (or high) values for such qualities.

However, measuring a property of interest of a dataset of location samples presents a number of technical challenges. A software application tasked with measuring the property of interest may have no knowledge of the source of the dataset (e.g., what type of positioning system or systems the dataset was derived from). Further, the software application may be tasked to work with datasets that include different types of information (e.g., one data set may include only location information, while another may include location, grouping and temporal information). Existing software applications typically struggle with these challenges.

Accordingly, there is a need for improved techniques for measuring a property of interest in a dataset of location samples that can address these and/or other shortcomings of prior techniques.

SUMMARY

In one example embodiment, an analysis application implements an improved technique for measuring a property of interest of a dataset of location samples (e.g., related to the dataset as a whole or of location samples within the dataset). The technique may be based on newly developed shift metrics (referred to herein as an "X-Shift metrics") for the property of interest.

An X-Shift metric implemented by the analysis application may include a metric phase implemented by a metric software process (hereafter the "metric process") of the analysis application, and a metric distance/classifier phase implemented by a metric distance/classifier software process (hereafter the "metric distance/classifier process") of the analysis application. The metric process is responsible for evaluating the dataset of location samples according one or more metrics, and may include one or more multi-stage pipelines. The multistage pipelines may include a sample-filtering subprocess, a grouping subprocess, a group-filtering subprocess, a sampling subprocess, a normalization subprocess, and a metric subprocess. Each multi-stage pipeline may produce a vector of values that measures a metric of the dataset. The vector of values from each of the multi-stage pipelines may be concatenated to produce a result of the metric process.

The metric distance/classifier process is responsible for estimating a final measure of the property of interest of the dataset of location samples, based on the vectors of values produced by the metric process. For example, the estimating may involve computing a metric distance in order to judge quality, diversity, entropy, information value, or another property of the dataset as a whole from the vector of values. Alternatively, the estimating may involve using a classifier to measure location samples within the dataset that are "good" or "bad" location samples (e.g., determined by comparison to a quality threshold), or that have low (or high) diversity, entropy, information value, etc. Such measure may take the form of a ratio (or equivalently a percentage), for example, a ratio of "bad" samples to "good" samples.

It should be understood that the example embodiment discussed in this Summary may include a variety of other features, including other features discussed below, and variations thereof. Further a variety of other embodiment may be utilized involving various combinations of the features discussed below and variations thereof. This Summary is intended simply as a brief introduction to the reader, and does not imply that the specific features mentioned herein are all the features of the invention, or are essential features of the invention.

BRIEF DESCRIPTION OF THE DRAWINGS

The description below refers to the accompanying drawings, of which.

DETAILED DESCRIPTION

Figure 1:
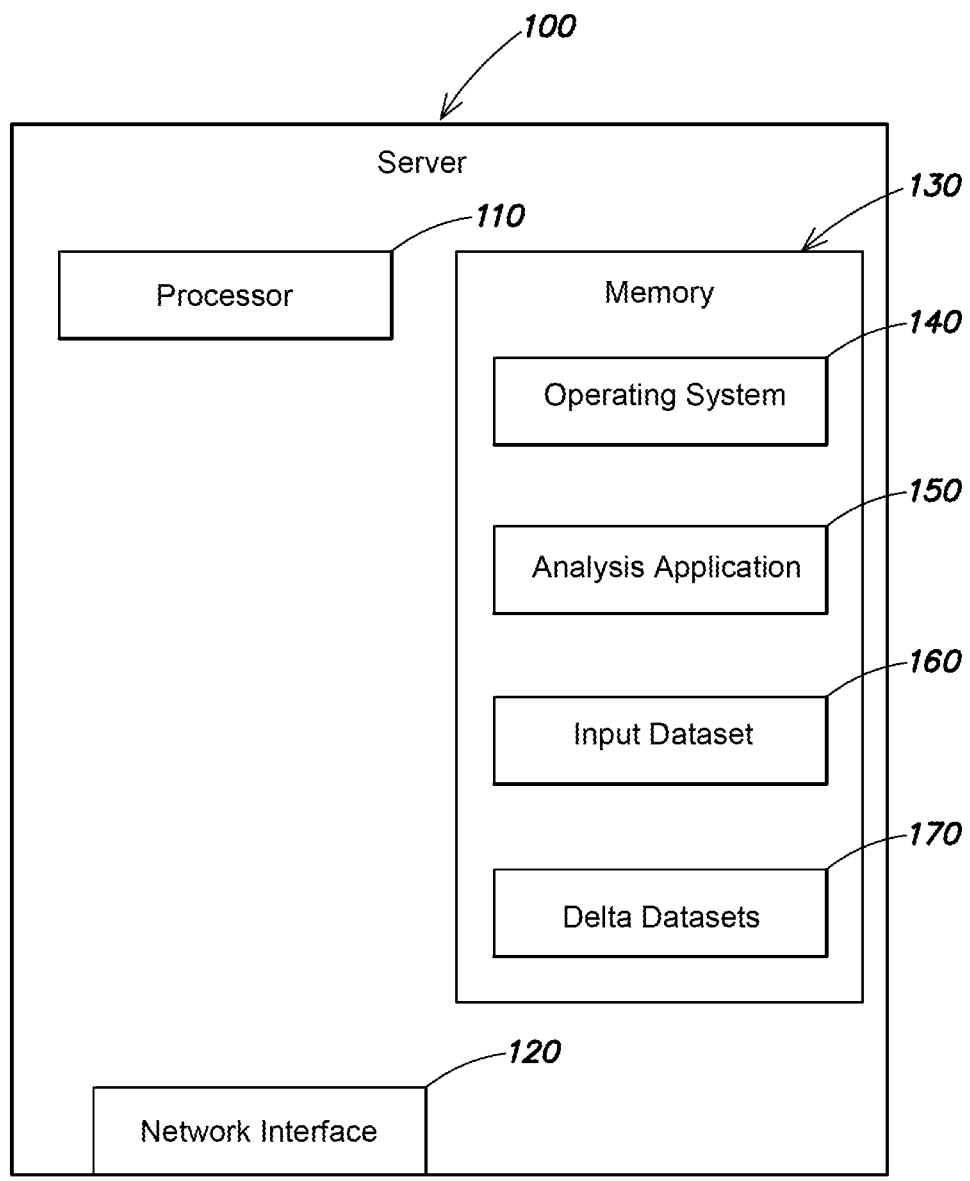
FIG. 1 is a block diagram of an example server that may execute an analysis application that implements an improved technique for measuring a property of interest of a dataset of location samples.

FIG. 1 is a block diagram of an example server 100 that may execute an analysis application that implements an improved technique for measuring a property of interest of a dataset of location samples. The server 100 includes a processor 110, a network interface 120, and a memory 130 that stores software (i.e., machine-executable instructions) and data. The software may include an operating system 140 and the analysis application 150. The data may include a dataset 160 of location samples (referred to hereinafter as the "input dataset" to distinguish it from other datasets), and possibly "delta datasets" 170 (i.e., paired datasets, one of which has location samples with a known property and one of which has location samples without the property, which are used in certain of the embodiments discussed below).

The input dataset 160 may include samples for a one or more electronic devices collected at multiple different times, using any of a variety of location determination systems, or various combinations of location determination systems. Each sample includes location information, as well as potentially grouping information (e.g., user ID of the user or device ID of the electronic device), and temporal information (e.g., a point in time or a time range). The input dataset may be provided to the server 100 from a remote device (e.g., operated by a third party) over a network (e.g., the Internet) accessible to the network interface 120 and results of the analysis application 150 returned to the remote device (e.g., according to a software as a service (SaaS) architecture. Likewise, other computing arrangements may be utilized.

X-Shift Metrics in General

Figure 2:
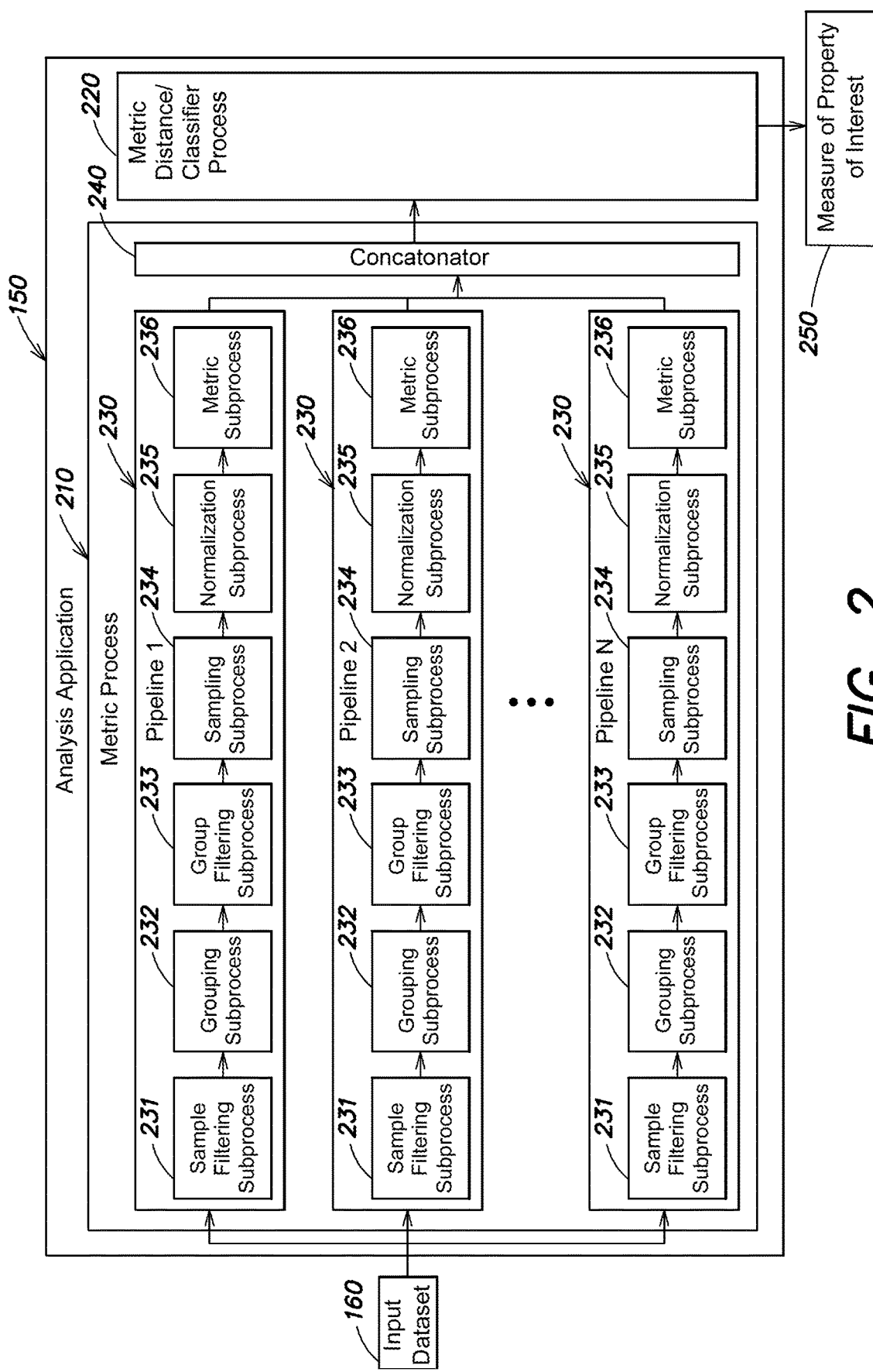
FIG. 2 is a high-level block diagram of software processes of the analysis application.

The analysis application may implement an X-Shift Metric for the property of interest in order to produce the result. FIG. 2 is a high-level block diagram of software processes of the analysis application 150. The X-Shift Metric implemented by the analysis application 150 may include a metric phase implemented by a metric process 210 that is responsible for evaluating a dataset of location samples according one or more metrics and a metric distance/classifier phase implemented by a metric distance/classifier phase 220 that is responsible for estimating a final measure of the property of interest of the dataset of location samples, based on the vectors of values produced by the metric process 210.

The metric process 210 may be made up of a set of one or more pipelines 230, each of which includes pre-processing subprocesses 231-235 and a final metric subprocess 236. The input to each pipeline 230 may be the entire input dataset 160. The result of each pipeline 230 may be a vector of values that measures a metric of the input dataset. In some implementations, the vectors of values from each pipeline may be fed to a concatonator 240 and then output, such that the result of the metric process 210 is the concatenation of the results of all the pipelines 230.

In more detail, each pipeline may include the following subprocess which implement corresponding stages: a sample-filtering subprocess 231, a grouping subprocess 232, a group-filtering subprocess 233, a sampling subprocess 234, a normalization subprocess 235, and a metric subprocess 236. The sample-filtering subprocess 231 and the group-filtering subprocess 233 (collectively the "filtering subprocesses") may implement filtering stages that allow for individual samples, as well as groups, to be removed from the input dataset 160. Further details of the filtering subprocesses 231, 233 may be found below. The grouping subprocess 232 implements a grouping phase that may take the input dataset 160 (now sample-filtered) and attach a group to each of the location samples of the dataset. Grouping may be based on grouping information already in the input dataset (e.g., grouping by user ID included as part of each sample in the dataset), may be related to locations of the samples (e.g., grouping by regions of the world), or some other criteria. Further details of the grouping subprocess 232 may be found below. The sampling subprocess 234 implements a sampling phase that may take the input dataset (now filtered and grouped) and sample a subset to continue processing. The sampling subprocess 234 may ensure scalability to very large input datasets 160. The unit for sampling may be the same as, or different than, the unit for grouping from the grouping phase. Further details of the sampling subprocess 234 may be found below. The normalization subprocess 235 implements a normalization phase that may apply both spatial and temporal normalization to the input dataset (now filtered, grouped and sampled). The normalization subprocess 235 may function to apply one or more transformations to the input dataset 160 needed in preparation of executing the metric subprocess 236. Further details of the normalization subprocess 235 may be found below. The metric subprocess 236 implements a metric phase that takes the input dataset (now grouped, sampled and normalized) and computes a vector of values that represent a metric for the dataset. Further details of the normalization subprocess 236 may be found below. The result of the metric subprocess 236 is treated as the result of the pipeline 230, which, in some implementations may be concatenated by the concatenator 240 with results of other pipelines 230.

The metric distance/classifier process 220 takes as an input the result of the metric process 210 and is responsible for responsible for estimating a final measure of the property of interest of the input dataset 160. In some implementations, the metric distance/classifier process 220 may take the form of a metric distance process and compute a metric distance in order to judge quality, diversity, entropy, information value, or another property of the dataset as a whole. In other implementations, the metric distance/classifier process 220 may take the form of a classifier process that measures location samples within the dataset that are "good" or "bad" location samples (e.g., determined by comparison to a quality threshold), or that have low (or high) diversity, entropy, information value etc. As discussed in more detail below, in one specific implementation, the metric distance/classifier process 220 takes the form of a classifier process that determines a measure of "good" location samples (measured as a ratio of "bad" samples to "good" samples) in the input dataset 160 by generating labeled datasets from a small set of delta datasets 170, and then comparing the result from the metric process 210 with information associated with the labeled datasets.

The Metric Process

Metrics

While the metric phase implemented by the metric subprocess 236 is the final phase, since the choice of metric may guide the operation of the other subprocesses 231-235, it is illustrative to discuss this subprocess first.

In general, a metric is a process that allows computation of a value for a dataset. Metrics may be divided into two distinct types: those based on inherent spatio-temporal statistics of the dataset, and those based upon combination with "gold-standard" datasets. Inherent spatio-temporal statistics measure intrinsic properties of the input dataset 160 in isolation. Gold-standards utilize existing datasets with known properties (referred to as "gold-standard datasets") to which the input dataset 160 may be matched, clustered, feature-compared, etc.

Figure 3:
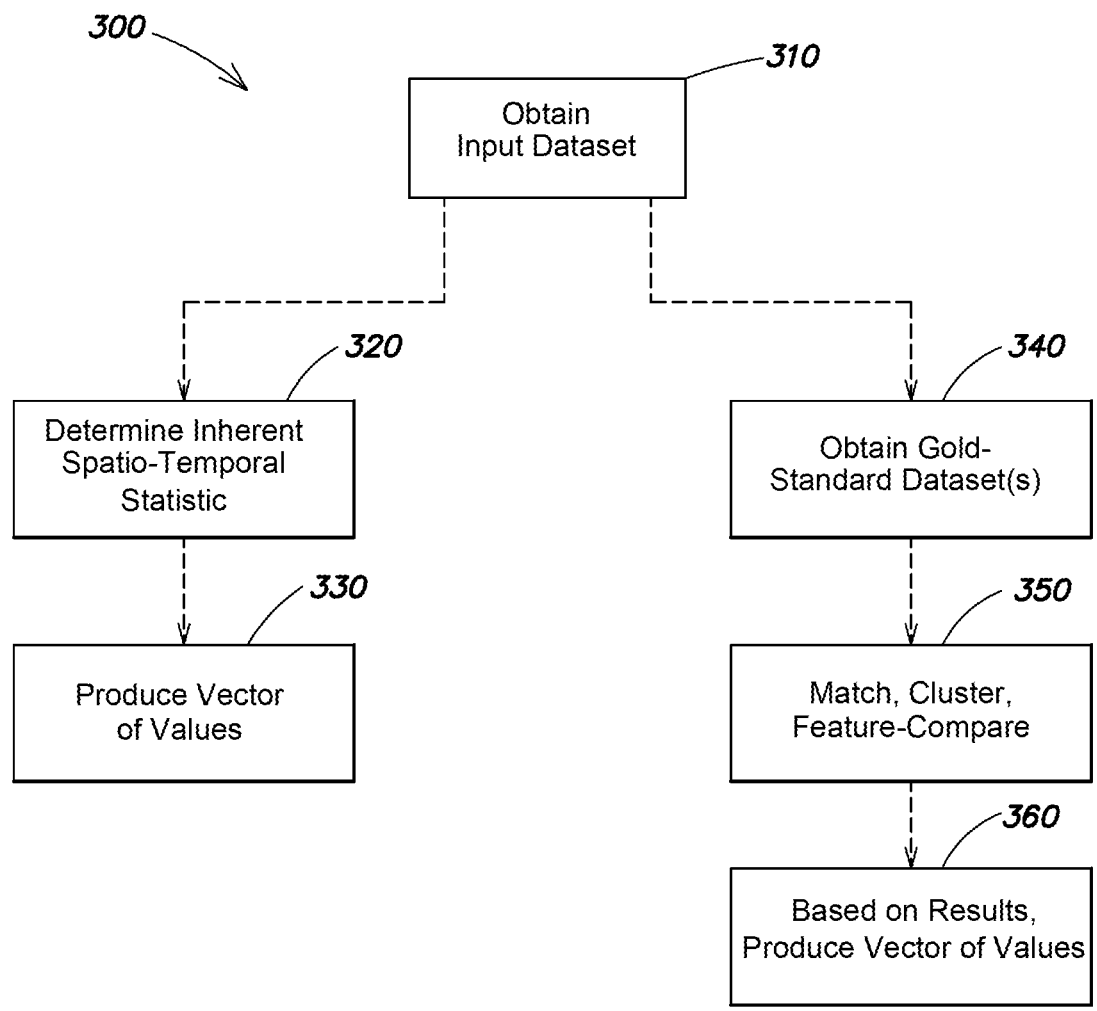
FIG. 3 is a flow diagram of an example sequence of steps that may be executed by a metric subprocess.

FIG. 3 is a flow diagram of an example sequence of steps 300 that may be executed by the metric subprocess 236. At step 310, the metric subprocess 236 obtains the input dataset 160 (e.g., as a filtered, grouped, sampled and normalized dataset from the normalization subprocess 235). At step 320, if the metric subprocess 236 is based on an inherent spatio-temporal statistic, an inherent spatio-temporal statistic is directly determined, and a vector of values produced at step 330. Alternatively, if the metric subprocess 236 is based on a gold-standard, one or more gold-standard datasets are obtained from memory 130 at step 340. At step 350, the metric subprocess 236 matches, clusters, feature-compares, or otherwise combines the input dataset 160 with one or more gold-standard datasets. At step 360, the results of this operation are used to produce a vector of values.

Inherent spatio-temporal statistics and gold-standards may be used by the metric subprocess 236 with an input dataset 160 whose samples include only location information, include additional group information for each sample, and/or include additional temporal information for each sample. However, the specific approaches employed may need to be adapted based on the information that is available. Table 1 provides a number of example approaches that may be used when different types of information are available. Further details and discussion of some of these example approaches is then provided in the text below.

| Information Available for Location Samples | Inherent Spatio-Temporal Approaches | Gold-Standard Approaches |
|---|---|---|
| location information only | central moments (including spread, skew, kurtosis), entropy, distinct number, model-based clustering, spatial point process modeling, diversity of location samples | difference in statistics (mean difference, quantile difference, probability of statistic versus gold-standard), all-to-all comparison, best-choice comparison distance, k-nearest-neighbor comparison, cover difference, matching distance (bipartite and full flow), morph distance (including morphological operators and model-based spatial morphology), cluster-of-both statistics (and change in clusters from gold), feature comparison (spatial statistics vector, location semantic features, i.e. venues), spatial point process model differences |
| location information and grouping information | location information only approaches + distinct trajectories, trajectory statistics including dynamics modeling with and without trajectory normalization, distinct groups numbers, group spread and central moments, group-wise entropy, model-based trajectory dynamics imputation | location information only approaches + group-wise distance (including trajectory similarity with and without normalization, best/worst/all-to-all comparison), group-wise cover distance, group-wise matching distance (using a per-group distance measure), group-wise morphing distance, group-wise cluster-of-both statistics (including similarity of, representative choice distances, model-based clustering distance such as likelihood and mutual information, non- |

-continued

| Information Available for Location Samples | Inherent Spatio-Temporal Approaches | Gold-Standard Approaches |
|---|---|---|
| | | parametric/parametric hypothesis test of changes in clusters), group-wise trajectory features comparison, spatial point process and marked spatial point process differences, distributions over group-wise statistics and their distances) |
| location information and temporal information | location information only approaches + velocity statistics, dynamics modeling, spatio-temporal point process modeling | location information only approaches + additional velocity statistics, spatio-temporal point process models difference, dynamics models and their difference |
| location information, grouping information and temporal information | location information only approaches + location information and grouping information + location information and temporal information + similarity metrics for trajectories | location information only approaches + location information and grouping information + location information and temporal information + group-wise trajectory models and dynamics differences |

Inherent Spatio-Temporal Statistics

Various inherent spatio-temporal statistics may be computed by the metric subprocess 236 when location samples include different types of information. For location samples that include only location information, the inherent spatio-temporal statistics may be central moments (e.g., mean, variance/spread, etc.), statistical moments (e.g., skew, kurtosis, etc.), entropy over the location samples (e.g., continuous entropy or by discretizing the space of location samples), the number of distinct locations (e.g., continuous or discrete), or general diversity of the location samples.

With the addition of temporal information to the location samples, the inherent spatio-temporal statistics may include the velocities of neighboring samples. The neighborhood itself may be based on spatial distance, temporal distance, a manifold in <location, time> space, or may include the use of a model to decide which samples are in the same neighborhood (including clustering algorithms). Further, with the addition of temporal information, "trajectories" may be computed by grouping samples together (e.g., in ways similar to neighborhoods).

The addition of grouping information to the location samples allows for the computation of distinct trajectories where the groupings are explicit. The metric subprocess 236 may compute group-wise trajectories, such as the mean trajectory for the entire dataset, or the longest/shortest trajectory. The addition of group information to the location samples also may allow for computation of a number of distinct users, as well as the number of users with a particular trajectory or property (e.g., such as the number of users with more than 7 locations visited).

If the samples only contain location and grouping information (but no time information) the metric subprocess 236 may order the location samples for each user to create a proxy for a trajectory (referred to as "ordinal trajectories"). Such ordinal trajectories may then be analyzed as above. Further, model-based approaches may take an un-ordered group of location samples and return an ordered set thereby calculating an ordinal trajectory. One such model/ordering-scheme is based on ordering location samples by distance from a nominal point (such as a center, a zero point, or an arbitrary fixed position).

The metric subprocess 236 may compute various spatio-temporal statistics from the input dataset as discussed above. The values of these statistics may inherently reflect the quality of the dataset. For example, it may be concluded that datasets with a larger spread in location are "better" than those with a smaller spread in location (and hence a metric is created based on the spread, an inherent spatio-temporal statistic of the dataset).

Gold Standard Approaches

Various gold-standards may also be performed by the metric subprocess 236. The discussion below assumes the input dataset 160 includes location samples having both grouping information and temporal information. However, it should be understood that grouping information may alternatively be inferred based on clustering the location samples. Similarly, trajectories can be approximated using ordinal trajectories based on groupings.

A gold-standard may involve matching to perform group-wise distance measurements. This includes matching every group in the input dataset with a gold-standard dataset using a best, worst, all-to-all, or k-nearest-neighbor standard. Once this group-to-group match has been established, the metric subprocess 236 may compute a mean distance of the matches (or a moment of the distance between the two sets of groups). Alternatively, the metric subprocess 236 may similarly choose the best and/or worst such match. The metric subprocess 236 may also compute the bipartite graph matching distance for such a matching, or even full graph statistics, such as min-flow/max-cut, clique size statistics, breadth, etc. The matching of groups includes comparing the trajectories for each group that may need trajectory normalization. Further, the metric subprocess 236 may compute a cover distance (i.e. how much does the gold-standard dataset "cover" the input dataset 160). The metric subprocess 236 may also compute a morphological distance (including such statistics as the Procrustean morphing distance).

Further, a gold-standard may involve clustering jointly a gold-standard dataset and the input dataset 160 and comparing clusters based on just the gold standard dataset to clusters created from the new joint dataset. Such comparison may involve examining differences in cluster centers, differences in cluster representatives, spread of clusters, number of clusters, location of clusters, and/or stability of clusters given parts of the new joint dataset. Clustering may be model-based where, for example, the metric subprocess 236 examines a distance of the clusters given the model for both a gold-standard dataset and input dataset. Further, clustering may be based on a mixture model, or may include mixed membership clusters, where each sample may belong to any number of clusters. Furthermore, it should be understood that a set of clusters can itself be treated as a smaller dataset, where each cluster has a number of representative samples. Various metrics that may be applied to an entire dataset may be applied to the smaller dataset derived from such clustering.

Further, a gold-standard may involve examination of generalized features of the gold-standard dataset and input dataset 160. The features may include any of the spatial statistics discussed above, as well as expert-knowledge based features. Further, the location samples themselves can have features attached to them, including semantic information about the properties of the location. For example, a feature based on semantic information may be that a particular location sample is at a bar. Similar to location-wise features, trajectories of location may have semantic features, including travel-time and dynamics information. As with locations and trajectories, groups may have semantic features. For example, a feature based on groups may be the times the groups are active, or the start and end points of trajectories for the groups, or the total length traveled. A computed set of features may be used to produce a vector of values, with an explicit goal vector being derived from the gold-standard datasets.

Further, a gold-standard approach may involve building a full spatio-temporal point process model (i.e., a distribution over the locations in a group of location samples, potentially including time). Unlike other metrics, distribution values have a distance function that explicitly makes use of their probabilistic nature. The distance between two distributions can be computed using Kullback-Leibler (KL) divergence between a goal and a target distribution. Furthermore, the metric subprocess 236 may treat a discrete distribution as a vector of values, and hence distributions with the same domains can utilize the above discussed metrics. For point process models, the metric subprocess 236 may also take an intensity function and compare these functions (either in the continuous domain of discretized using an above-discussed metric).

Operation of the above discussed metric may be improved by subjecting the input dataset 160 to filtering subprocesses 231, 233, a grouping subprocess 233, a sampling subprocess 234, and/or a normalization subprocess 235 prior to passing the input dataset to the metric subprocess 236.

Grouping

The grouping subprocess 232 implements a grouping phase that may take the input dataset 160 and attach a group to each of the samples of the dataset, to create subsets for processing. An explicit grouping operation may assist processing performed by the metric subprocess 236, since the formed groups may define trajectories, the formed groups may allow location sample to be considered "comparable" in a particular fashion as compared to samples outside the group, the formed groups may provide higher sample diversity or count per group as compared to any inherent groups implied in the input dataset 160, or may provide other benefits.

Figure 4:
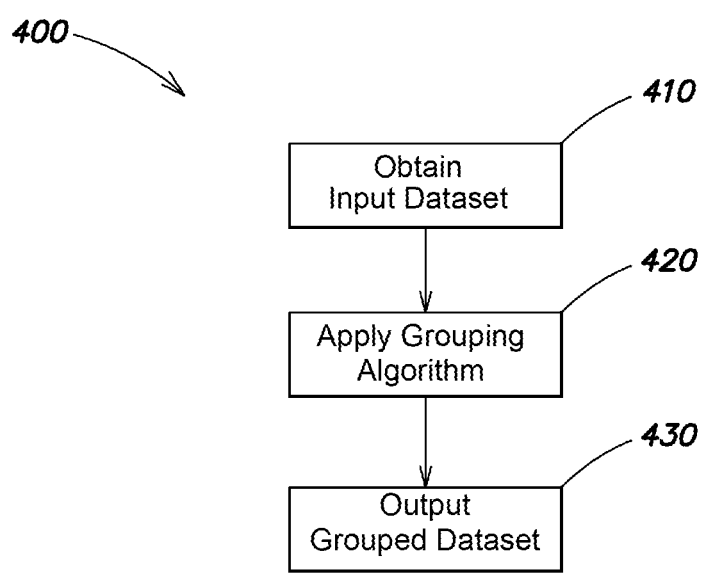
FIG. 4 is a flow diagram of an example sequence of steps that may be executed by a grouping subprocess.

FIG. 4 is a flow diagram of an example sequence of steps 400 that may be executed by the grouping subprocess 232. At step 410, the grouping subprocess 232 obtains the input dataset 160 (e.g., as a filtered dataset from the sample-filtering subprocess 231). At step 420, a grouping algorithm is applied to the input dataset. At step 430, a grouped dataset including location samples organized into one or more groups is output (e.g., to the sampling subprocess 234).

The grouping may be based on various selections or combinations of grouping information already in the input dataset 160, such as user ID or device ID (e.g., grouping by user or device), locations (e.g., grouping by regions of the world), or other information. Alternatively, grouping may be based on calculated information not already in the dataset. In general, grouping may create groups that include samples for one individual or device, or include multiple individuals or devices (e.g., based on a factor such as usage model). For instance, the grouping subprocess 232 may group all location samples from fixed-location devices into a single group, rather than treat them as separate groups denoted by their different device IDs. In another instance, location samples for multiple devices with a lack of location diversity may be grouped together into a group for a "meta-device" that contains more (or more diverse) location samples. Such a group may allow for better measurement of the quality for the data by allowing to certain grouped location samples to be treated as coming from a cohesive "unit".

There are several algorithms that may be used by the grouping subprocess 232 to infer the groupings. One algorithm uses a model of groups and tries to fit a best set of groups to the location samples. Such a model may explicitly include information about how many groups to try to form. The algorithm may utilize clustering techniques, effectively clustering the location samples into clusters that are considered to be groups. Possible clustering techniques may include agglomerative clustering, similarity-based clustering (e.g., affinity propagation), representative based clustering, spectral clustering, model-based mixture clustering, model-based multiple-membership clustering, non-parametric model-based or feature-based clustering, etc.

Filtering

The sample-filtering subprocess 231 and the group-filtering subprocess 233 implement filtering phases that may take the input dataset and remove certain location samples that are determined to be less useful (or useless) for measuring the property of interest. Filtering may be performed before or after the grouping subprocess 232 groups the location samples in the input dataset 160, and may take a variety of forms.

Figure 5:
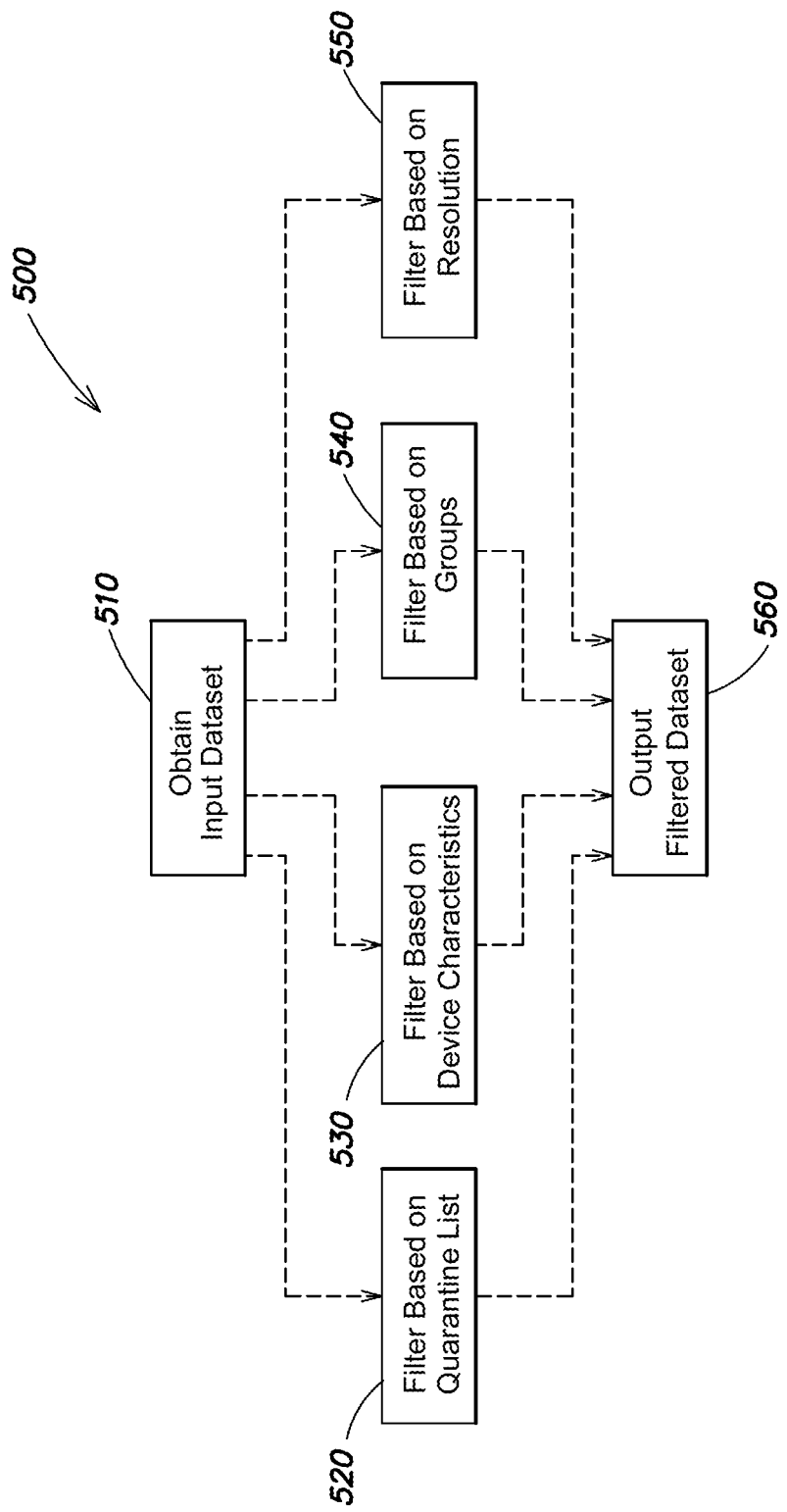
FIG. 5 is a flow diagram of an example sequence of steps that may be executed by filtering subprocesses.

FIG. 5 is a flow diagram of an example sequence of steps 500 that may be executed by the filtering subprocesses 231, 233. At step 510, the filtering processes 231, 233 of a pipeline 230 obtains the input dataset 160 (e.g., as a filtered dataset from the sample-filtering subprocess 231). At steps 520-550, one or more selected types of filtering (i.e. filtering based on comparison to a quarantine list 520, filtering based on device characteristics 530, filtering based groups 540, or filtering based on resolution 550) are applied. At step 560, a filtered dataset is output (e.g., to the grouping subprocess 232 or the sampling subprocess 234).

Looking to the types of filtering in more detail, the filtering subprocesses 231, 233 may remove certain location samples which are known to be less useful (or useless) for measuring the property of interest based on comparison to a quarantine list (i.e. a predetermined list of known-to-be-bad samples). Such known-to-be-bad samples have already been determined only add noise and/or irrelevant information to the input dataset.

In addition, the filtering subprocesses 231, 232 may also restrict the input dataset 160 to a particular subset of location samples with a specific property. For example, the filtering subprocesses 231, 232 may remove location samples from stationary devices, or remove all but the location samples for users which are known to the travelers.

Further, the group-filtering subprocess 233 may remove groups in the input dataset 160 that include too few or too many location samples (e.g., based on comparison to thresholds), or whose sampling rate is outside of a desired range. In some implementations, the filtering subprocesses 231, 232 may attach venue information to location samples, and filter using this semantic information (e.g., removing all location samples that are from the venue "gas stations"). Likewise, in some implementations, the filtering subprocesses 231, 232 may remove duplicate location samples.

The filtering subprocesses 231, 232 may also remove location samples whose resolution is suspect (e.g., location samples whose resolution indicates that an area represented is too large or too small), or whose resolution is below a resolution threshold. Use of a resolution threshold may assist in removing location samples from bad (i.e. unreliable or unhelpful) sources. Good quality location samples typically have a high degree of resolution. Likewise, good quality sources typically provide fine-grained locations. Similarly, low quality location samples typically have low resolution and bad sources typically provide course locations. Devices do not "teleport", but rather move in a continuous manner through space and time. Hence, location samples should also reflect the continuous nature of reality. Bad sources often do not reflect fine-grained locations, and instead often result in coarse location samples that appear to teleport from one region of space to another region of space. Further, coarse location samples often are not specific enough to be helpful. For example, it is often not helpful to state that a device is within 10 kilometers of the center of New York. There are many devices in that region, and it is essentially a non-information sample. Accordingly, the filtering subprocesses 231, 233 may filter out location samples whose resolution is below a resolution threshold.

Sampling

The sampling subprocess 234 implements a sampling phase that may take the input dataset 160 and select from it a subset of location samples to continue processing, enabling the techniques described herein to scale. Sometimes an input dataset 160 is too large to process, or to process efficiently. It may be desirable to sample the input dataset 160 and infer a metric for the entire dataset from the smaller sample. Such sampling may be performed by any of a number of different sampling algorithms.

Figure 6:
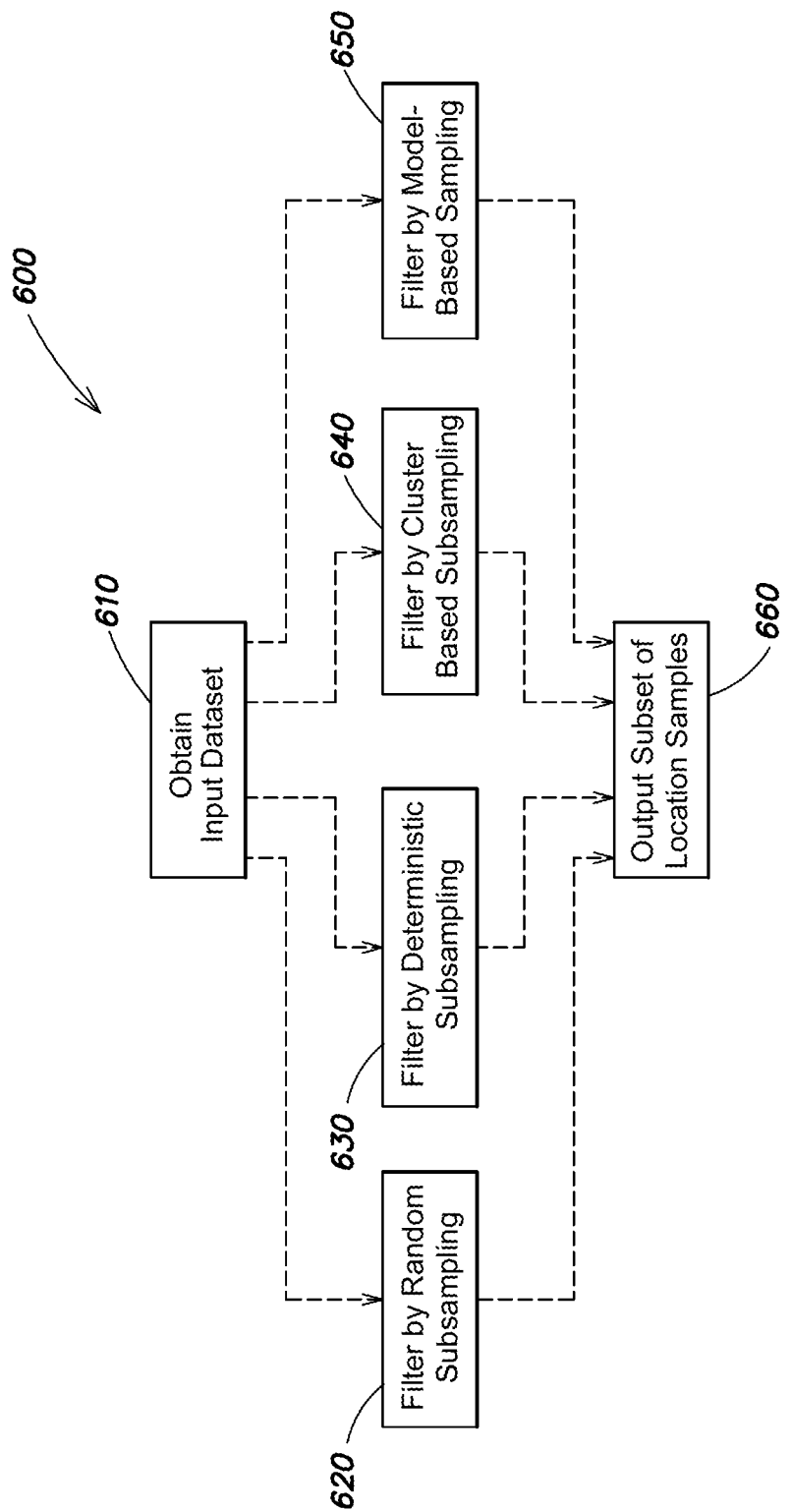
FIG. 6 is a flow diagram of an example sequence of steps that may be executed by a sampling subprocess.

FIG. 6 is a flow diagram of an example sequence of steps 600 that may be executed by the sampling subprocess 234. At step 610, the sampling subprocess 234 obtains the input dataset 160 (e.g., as a filtered, grouped dataset from the group-filtering subprocess 233). At steps 620-650, one or more selected types of filtering (random subsampling 620, deterministic subsampling 630, cluster-based subsampling 640, and model-based sampling 650) are applied to form a subset of location samples. At step 660, the subset of location samples is output (e.g., to the normalization subprocess 235).

Looking to these types of sampling in more detail, random subsampling may select location samples to retain on a purely random basis. Such random subsampling may provide certain guarantees that the result is representative of the entire input dataset as long as the unit of sampling retains the properties used by the metric employed by the metric subprocess 236. For example, the grouping information used by the grouping subprocess 232 may be used as the unit for subsampling in order to not artificially break up groups.

Deterministic subsampling may involve choosing the best/worst samples from the input dataset 160, compared to a gold-standard, or choosing a spatially varied or time-varied dataset (or both).

Cluster-based subsampling may involve sampling based on cluster representatives (or just using the representatives).

Further, model-based sampling may involve computing a model indicating which locations/features are associated with "good" samples, and then sampling using such a model.

The metric for the full input dataset may be generated from a sampled version of the input dataset using various techniques. For example, the mean of many location samples (with theoretical guarantees given the law of large numbers) may be used for the full input dataset, or the results for many location samples combined using agglomerative statistics and used for the entire input dataset. Alternatively, an explicit model of the metric for the full dataset metric may be built given the metric for a sample, and this model used to estimate/infer values from values for the sample. These and other processes may be performed by interaction of the sampling subprocess 234 with the metric subprocess 236.

Normalization

The normalization subprocess 235 may apply transformations to the input dataset 160 to address issues in the dataset and otherwise prepare it for processing by the metric subprocess 236. Normalization may serve several functions. First, normalization may address issues where metrics may be influenced by properties of the input dataset 160 that are not relevant (referred to as "covariates"). For example, the entropy of a group of location samples may be based on both the locations in the samples as well as the number of samples. Normalization may be used to remove the number-of-sample influence, so that an entropy statistic purely reflects the locations themselves.

Second, normalization may allow for better measurement of information contained in an input dataset 160 that is applicable to a particular system. While an input dataset 160 may include samples that are pristine, the entire input dataset 160 may contain very little value (or information) for a particular system because of the properties of the data. For example, if every location sample is the input dataset 160 is completely accurate, but the dataset only contains the location samples for stationary uninteresting objects, then the useful information contained in the input dataset 160 may be minimal, even though the locations are pristine. Normalization may help identify this issue.

Figure 7:
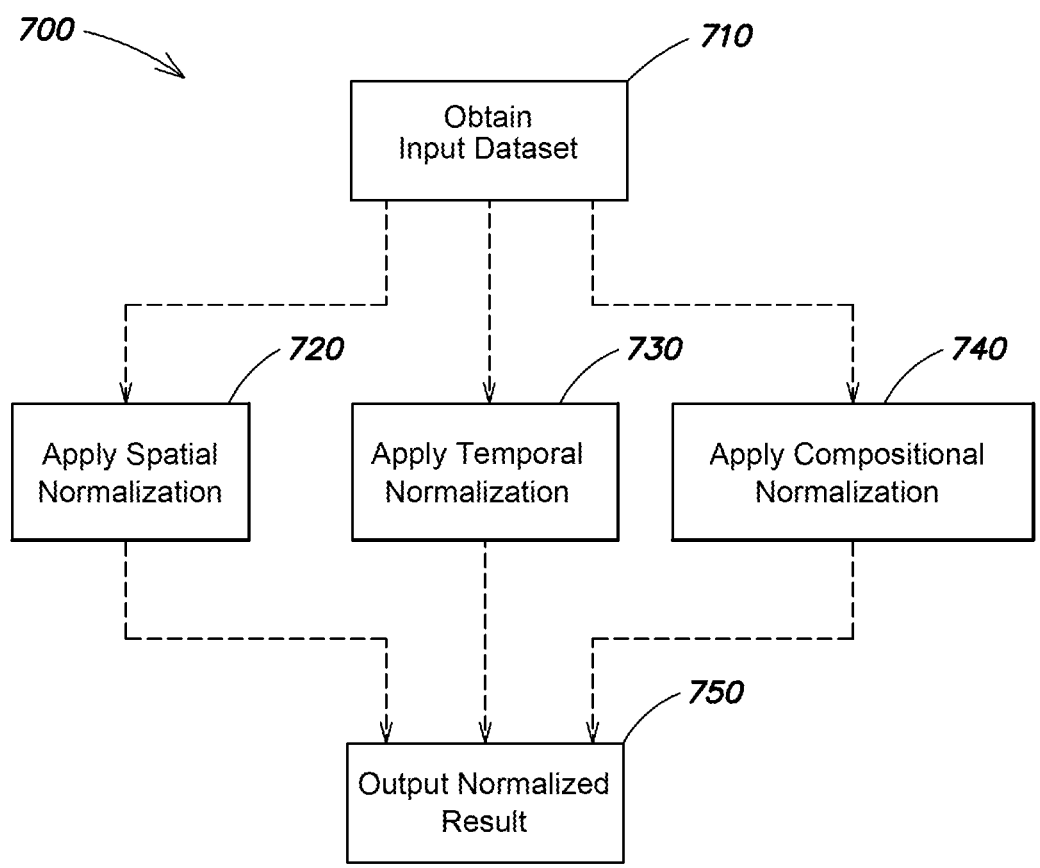
FIG. 7 is a flow diagram of an example sequence of steps that may be executed by a normalization subprocess.

FIG. 7 is a flow diagram of an example sequence of steps 700 that may be executed by the normalization subprocess 235. At step 710, the normalization subprocess 235 obtains the input dataset 160 (e.g., as a filtered, grouped and sampled dataset from the sampling subprocess 234). At steps 720-740, one or more different types of normalization are applied. At step 720, spatial normalization may be applied to the input dataset 160. At step 730, temporal normalization may be applied to the input dataset 160. Further, at step 740, compositional normalization may be applied to the input dataset 160. At step 750, the normalized result is output (e.g., to the metric subprocess 236).

Spatial Normalization

Depending on the implementation, spatial normalization may take a variety of different forms, including: centroid removal, warping to a unit sphere, warping to a unit cube, topological remapping, metric/manifold learning to make a new manifold, clustering and taking only representative samples, spatial stratification, affine transform matching, or morphological distance normalization, among others.

In general, spatial normalization tries to extract covariates from spatial data in the location samples of the input dataset 160. Covariates from spatial data may include the actual locations in the samples; hence normalization may be based on centroid removal as well as applying a transform. Spatial transformation may also include classic scaling/shearing (affine transforms) such as warping to a unit sphere/cube. More general transformations may include projecting the spatial point into a manifold with a metric distance. Such a manifold may be learned from the location samples themselves using metric learning and manifold learning techniques, or may be given by an expert oracle. Further, spatial normalizations may include stratifying space into regions that are then compared individually (creating sub-datasets of the original dataset for each spatial region), and then normalizing the spatial region locations using any of a number of normalization approaches. Still further, location samples may be clustered and a set of representative samples from the clusters used. The clusters themselves may be in a different metric space, and hence using cluster centers may normalize the data to be in the metric space of the clustering algorithm, rather than an original metric space.

When normalizing, the normalization subprocess 235 may operate to cluster space itself. In some cases, the actual locations in the location samples of the input dataset 160 are not as important as what the locations represent. For example, it may be advantageous to spatially cluster the locations by what venue they reside in, and used the venue itself as representative for the cluster. Such a spatial normalization allows use of trajectories of venues, rather than trajectories in space. Venues (and their trajectories) may contain semantic information about the places and behavior exhibited by a group of location samples, and semantic information may be used to determine a property of interest of the input dataset 160.

When normalizing, the normalization subprocess 235 also may operate to quantize space for information. A metric may calculate entropy over the locations for a group of location samples. In order to better measure the quality of an input dataset 160 using the metric, the normalization subprocess 235 may quantize space using a clustering scheme. This allows for the entropy calculation to result in a better estimate of the distribution over locations for a group. Without proper quantization, it may be that every location sample for a group is distinct and hence the entropy is at a maximum, since no location was truly visited more than once. However, by treating nearby locations, or locations that are all within the same venue, as essentially the same location, spatial normalization may be used to cluster these similar locations together into one location that is then fed to the metric subprocess 236. The spatial normalization allows for selection of exactly what is informative for a location (e.g., the exact location, the venue visited, the region of space, the closeness to the previous location, etc.)

Temporal Normalization

Depending on the implementation, temporal normalization may take a variety of forms, including: sampling rate matching, time warping, temporal stratification, location imputation, group-wise classification, producing features from trajectories, etc. In general, temporal normalization may involve handling temporal covariates. For example, with two different trajectories of location samples including location information and temporal information, temporal normalization may normalize them in order to compare the trajectories.

The normalization subprocess 235 may extract features from trajectories and use these features to compare trajectories. The features are then a normalized version of the data samples since they encode the information in a consistent, comparable way.

One approach to do this is to match the "sampling rate" (i.e., the number of samples per unit time) of the two trajectories. Such matching may be accomplished via random subsampling, importance sampling, or building a dynamics model for each trajectory, and then selecting the same points in time from both dynamics models. Another approach is to warp time such that the samples from one trajectory are matched with their closest sample from the other trajectory. Time warping may drop samples or may include a many-to-one mapping of samples. Such approach may be considered a form of bipartite matching or as a morphological operator (and its inherent distance) and so the warping may be guided by such metrics.

In other alternatives, sub-datasets may be created based upon region of time, and the normalization subprocess 235 may normalize each in turn, according to a stratified temporal normalization scheme. In still other alternatives, the normalization subprocess 235 may impute the location samples along a trajectory for time spots from another trajectory and vice versa, creating two trajectories with the same times. Imputation may use a model of the trajectory through space and time, or may be performed using model-free approaches, such as a nearest-neighbor location sample from the entire dataset. The normalization subprocess 235 may also use clustering and representatives of the trajectories to normalize time similar clustering for spatial normalizations described above.

Compositional Normalization

Compositional normalization may involve normalizing compositional elements of the input dataset 160 as a whole. A particular compositional property of location samples or groups may be selected, and the normalization subprocess 235 then samples a new dataset. An example of a desired composition may be 50% of location samples coming from a particular region of space, and the rest from elsewhere.

Random sampling without replacement may be used to provide a new dataset having a wanted composition at the expense of the overall potential size of the resulting dataset (e.g., if it is desired that 10% of the dataset has the property, but only 1% of the original dataset has the property, then the resulting dataset may only be as large as a $\frac{1}{10}^{th}$ of the original input dataset). Alternatively, random sampling with replacement may allow for an exact wanted composition, while keeping the dataset size the same. However, it may incur an increase in the variability of the resulting dataset, because the replacement may introduce duplicates. In still other alternatives, stratified sampling or another procedure may be used to pick location samples in such a way that the resulting dataset has the wanted composition.

One specific type of compositional normalization that may be employed by the normalization subprocess 325 is venue representative spatial normalization, which allows for normalization of a dataset by composition of its semantic locations. For example, the normalization subprocess 325 may normalize a dataset to have 50% of location samples come from urban areas, 40% of which are in retail spaces, and to have other 50% of location samples come from roads. Such a normalized dataset may help measure the quality of the dataset in cases where a recipient system of the results only cares about certain types of venues and/or users (e.g., cares about urban retail stores and tourists)

The Metric Distance/Classifier Process

The vector result from the metric process 210 may be used in various ways by the metric distance/classifier process 220 to determine a measure of a property of interest 250 in the input dataset 160. In some implementations, the metric distance/classifier process 220 may take the form of a metric distance process and compute a metric distance in order to judge a measure for the entire input dataset 160. In other implementations, the metric distance/classifier process 220 may take the form of a classifier process that measures location samples within the dataset that have a certain property (e.g., are "good" samples, determined by comparison to a quality threshold). Both alternatives are discussed below Measure for Entire Dataset When the metric distance/classifier process 220 takes the form of a metric distance process, metric distance may be calculated using different techniques, including secondary metrics, distribution distances and metrics, agglomerative statistics and manifolds, among others.

Secondary Vector Metrics

In one embodiment, the metric distance process may impose a secondary metric (referred to as a "vector metric") over the vector of values output from the metric process 210 in order to judge quality from the computed statistics. The vector metric may take a variety of different forms. For example, the vector metric may include $L_x$ norms, where $x=\{1, 2, \inf.\}$, or threshold metrics that turn the vector of values into a binary vector, to which another vector metric is applied. Alternatively, the vector metric may calculate the probability that two vectors came from a same random source. Such calculation may produce a similarity score, which indicates when two vectors of values are similar or not, and that can be used as a measure of a metric between them. Further, a model may be generated, and employed to calculate the probability of two vectors being generated by the same underlying dataset.

In order to determine from this similarity measure which of two vectors of values is "better" or "worse", various techniques may be employed. In one technique, a set of "goal" vectors may be used as a basis for comparison. The set of goal vectors may be randomly generated. In a second technique, inherent properties of similarities may be used. An example inherent property may be change in similarity dependent on a perturbation of vectors. A vector whose perturbation induces the least change in similarity between the two (or between the perturbed and original) may be considered more "stable" and thereby a "better" vector than the other.

Distribution Distance and Metrics

In another embodiment, the metric distance process may examine distribution distances and metrics. To compare two distributions, the metric distance process may use several metrics specific to distributions. For example, it may use KL-Divergence, which operates to calculate an amount of information needed to shift a source distribution to a target, which may be used to judge how similar two distributions are. The metric distance process may also judge the distance between distributions by comparing the modes and moments of the distributions (also called moment-matching). Further, the metric distance process may select a set of "test points", and use the probability mass at each point (or a small "ball" around the point) between the distributions to find a distance between distributions. The metric distance/classifier process 220 may alternatively treat discrete distributions as an ordered vector of probability values and apply a vector metric to these vectors.

Agglomerative Statistics

In another embodiment, in cases where the metric process 210 outputs multiple vectors of values, the metric distance process may reduce the set of vectors into a single "representative" vector and then use this representative to judge distances/metrics. The representative vector may be considered to agglomerate the statistics since it encodes the information of a set into a single unit. Agglomerative statistics that may be used include quantiles (including median, min, and max), mean, random-choice (e.g., selecting a random element), and first-last seen, among others. Computation of statistics such as the mean may be based on an assumption that the vectors of values lie in a manifold with a particular manifold distance function.

Manifolds

In another embodiment, the metric distance process may examine manifolds to compute the distance between vectors of values. The metric distance process may assume these values are embedded in a manifold with a manifold distance function. One such manifold is the Euclidean manifold, where the distance between vectors is their Euclidean distance. The metric distance process may further re-weight different dimensions to obtain a linear-weighted distance computation (i.e. another manifold). Further, the metric distance process may utilize a model of the manifold that the vectors inhabit, and use the manifold distance in that manifold. In general, the metric distance process may learn a manifold vectors inhabits using manifold learning (or metric learning), based on vectors believe to be close to each other.

Measuring Location Samples within the Dataset (e.g., Ratios)

The metric distance/classifier process 220 may also operate to measure location samples within the input dataset that have a certain property (e.g., "good" location samples, measured as a ratio of "bad" samples to "good" samples). The metric distance/classifier process 220 may perform any of several different techniques to perform such measurement.

Sample and Forget

One technique the metric distance/classifier process 220 may use is a sample and forget technique. Such technique may involve measuring the property for a subset, or subsample, of the input dataset 160 and taking that measurement as the measurement for the entire input dataset. The subsampling may be performed so as to not artificially disrupt the property of interest. For example, when the property of interest pertains to entire trajectories, the metric distance/classifier process 220 may subsample entire trajectories rather than breaking them randomly.

Classifiers

Another technique may involve classification, and in such case the metric distance/classifier process 220 may take the form of a classifier process. The classifier process may utilize labeled datasets and compare the vector of values output from the metric process 210 with values associated with the labeled datasets. The comparison may be conducted using any of a variety of types of classifier suited for multi-label classification problems, including support vector machines (SVM), extremely randomized trees, maximum likelihood (ML) and maximum a posteriori probability (MAP) estimators, etc. In some cases, the labeled datasets may be generated from a smaller number of delta datasets 170, using processes described below.

Figure 8:
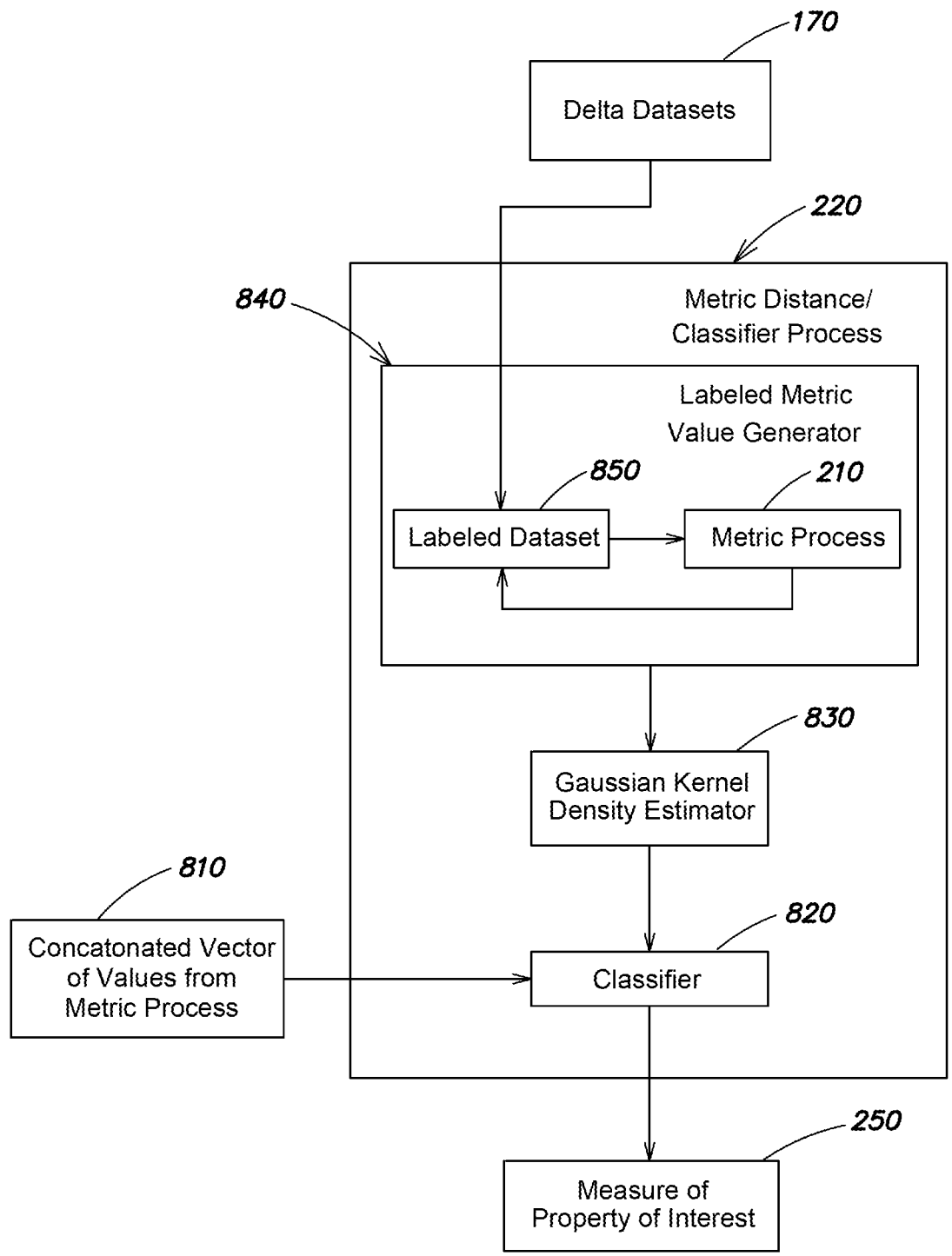
FIG. 8 is a block diagram of an example metric distance/classifier process configured as a classifier that uses one or more labeled datasets to determine a measure of a property of interest.

FIG. 8 is a block diagram of an example metric distance/classifier process 220 configured as a classifier process that uses one or more labeled datasets to determine a measure of the property of interest 250. As explained in more detail below, a vector of values 810 from the metric process 210 may be passed to a classifier 820 along with information for labeled datasets 850. The labeled datasets 850 may be generated by a labeled metric value generator 840, using delta datasets 170 and, in some cases, by feeding samples through the metric process 210. In some implementation, a Gaussian kernel density estimator 830 may be used with the labeled datasets 850 prior to classifying. As an end result, a measure of the property of interest 250 (e.g., a ratio of "bad" samples to "good" samples) is output.

a. Generation of Labeled Datasets

When using a classifier 820 and labeled datasets 850 it may be desirable to have many labeled datasets available with ratios of the property of interest. The labeled metric value generator 840 may generate such labeled datasets 850 on demand from a small number of delta datasets 170. The delta datasets 170 may be sets that include a subset of location samples with a property of interest and a subset of location samples without the property of interest (i.e. a 0% and a 100% delta dataset by construction).

The labeled metric value generator 840 may generate labeled datasets 850 from delta datasets 170 which contain samples with a known ratio of the property of interest (so the ratio of the delta dataset is known to be Y % or Z %, etc.). Given a pair of delta datasets 170, one with Y % and the other with Z %, the labeled metric value generator 840 may generate a labeled dataset 850 which has a known X % ratio of the property of interest. If the wanted ratio is bounded by Y and Z (so Y<=X<=Z), the labeled metric value generator 840 may generate the labeled dataset with X % by bootstrap re-sampling (with replacement). The labeled metric value generator 840 may resample a number of location samples from the delta dataset with Y % and a separate number of location samples from the delta dataset with Z %, such that the resulting number of samples is of a fixed size. The labeled metric value generator 840 may calculate how much from the Y % delta dataset and from the Z % delta dataset is needed to produce a resulting labeled dataset with X % of the samples having the property. By construction the labeled dataset 850 has a ratio of X %. The metric value generator 840 may produce many different labeled datasets 850 with different known ratios using this procedure.

The labeled metric value generator 840 may also generate labeled datasets 850 from a pair of delta datasets 170 with ratios outside the range of the delta datasets. Given a pair of delta datasets with Y % and Z % ratios, the labeled metric value generator 840 may generate a new dataset with an X % ratio which is outside of the (X, Z) range. The labeled metric value generator 840 may first generate a set of datasets with ratios $Q_0$, $Q_1$, $Q_2$, etc., all of which are within the range (Y, Z), and then use a bootstrap resampling method. For example, each generated Q dataset may be run through the metric process 210 to produce a vector for each of the generated datasets. The labeled metric value generator 840 may then fit a model to the vector generated for the Q datasets. The labeled metric value generator 840 may then extrapolate where the vector of the X % dataset would lie using a curve (e.g., a line) fit to the model.

The model fit to the vector of values may be based on linear interpolation, or a more complicated type, such as a spline curve with smoothness constraints. A spline model may be able to explicitly model that the distance between different ratios on the curve is constant along the spline. Spline models also may allow encoding of smoothness constraints on the generated dataset results. The labeled metric value generator 840 may fit an exponential curve or a polynomial curve with a fixed order, among other options. The fitting algorithm for the model fit may be least-squares fitting, or a more complex inference algorithm, depending on the implementation.

b. MAP Classifier

One classifier 820 that may be used in the classifier process is a MAP classifier. A suitable MAP classifier may be implemented using the following procedure. Given a function F(dataset) which returns a feature vector for a dataset, a set of wanted ratios may be selected, called R={0%, 10%, 20% . . . 100%}. For each of the wanted ratios, an empirical probability distribution $D_{emp, x\%}$ may be built from the labeled datasets 850 by taking the features of those datasets with the wanted ratio, and binning them into buckets. Each bucket additionally may have an initial count of $\varepsilon_{feat}$. The counts may be normalized by dividing by the total in all buckets, to produce an empirical distribution whose domain is the buckets. The buckets may be chosen to have a fixed bucket size across a feature space (such as a grid), or can be an arbitrary tessellation of feature space. Such a tessellation may be chosen to maximize a particular property of the resulting empirical distributions (such as smoothness, entropy, spread, etc.).

Using the empirical distributions from the labeled datasets 850, a MAP estimate may be computed given a new dataset. For an input dataset feature vector f*=F (input dataset). Next, Baye's rule may be applied to compute the posterior probability p(x %|f*) for each of the ratios in R:

$$p(x\% | f_*) = \frac{p(f_* | x\%)p(x\%)}{\sum_{y \in R} p(f_* | y)p(y)} = \frac{D_{emp,x\%}(f_*)p(x\%)}{\sum_{y \in R} D_{emp,y\%}(f_*)p(y\%)} \quad (1)$$

This yields a distribution over the potential ratios for the input dataset 160. A ratio with maximum probability may be selected for the MAP classifier. Furthermore, a "confidence interval" may be generated as the estimated probability of the maximum ratio. Also, a range of ratios may be returned which span a particular probability mass.

The priors p(x %) may be defined for the above procedure. Initially, a uniform prior may be chosen, but there may be provision for updating when new data arrives. Also, a Gaussian kernel density estimator 830 may be used to build the p(f*|x %) from the labeled datasets 850, rather than relying on empirical distributions.

Validation

In some implementations, the above discussed labeled datasets may be used to validate the X-shift metric. Newly generated labeled datasets 850 from the label metric value generator 840 may be fed back to the metric process 210 to produce a vector of values, and this vector fed to the classifier process to perform a classification. Since the labeled datasets have known labels, if they are correctly classified by the classifier 820, then the X-shift metric may be validated.

Feedback and Updating

Because of the use of Baye's rule in Equation 1 above, the resulting measure of the input dataset may be updated by updating the prior p(x %) with new information from a wide variety of datasets that are seen and processed. Updating can be performed by selectively optimizing the different parameters in order to best differentiate the known labeled datasets. Such a process determines the best metric for classifying the measure (e.g., ratio) of a property of interest.

Further, a closed-loop feedback mechanism may be employed in generating the measure of the property of interest using labeled datasets 850. Given the delta datasets 170 used by the labeled metric value generator 840, a particular mixture of the delta datasets may be evaluated using the metric process 210, and the resulting vector of values compared those of the input dataset 160. A feedback loop may be established to repeatedly generate different mixtures of labeled datasets 850 from the delta datasets 170, until a generated labeled dataset and the input dataset are judged to be of the same quality using the metric process 210. Then, the classifier process may conclude that the measure (e.g., ratio) of the input dataset 160 is the same as the generated dataset's label, and this result output as the measure of the property of interest 250

By coupling between the classifier process and the metric process 210, the analysis application 150 may optimize any of the parameters used in processing. These parameters include spatial quantization, bit quantization, sampling stratifications, and gold-standards, among others. Since, the metric should differentiate opposing delta datasets 170, optimization may be performed by optimizing the parameters of the metric which results in the MAP classifier distributions having the highest entropy and the largest differentiability between labels associated with the delta datasets 170. For example, the system may be optimized to detect the difference between 20% "bad" data datasets and 30% "bad" data datasets.

Such optimization may be applied to various parameters. For example, if venues are used in spatial normalization to normalize location samples into semantic samples of venues, then venues may be optimized in order to give the more differentiable and informative MAP classifier distributions. This allows for the generation of entirely unknown, but salient, venues in space (and time). Such "discovered" venues may be specific to the input dataset 160, and encode informative semantic regions of space and time that drive the quality of the input dataset.

Specific Example

Entropic Shift Metric

The above discussion provides a number of possible implementations of an X-Shift Metric by the analysis application 150, using variously configured metric processes 210 and metric distance/classifier processes 220. A specific example of one possible X-Shift Metric, termed the Entropic Shift Metric, is provided below. The example indicates a specific configuration of the processes that may return an estimated ratio of "bad" location samples to "good" location samples in the input dataset 160.

To implement the Entropic Shift Metric, the analysis application 150 may employ a metric process 210 with two pipelines 230. The first pipeline may include a sample-filtering subprocess 231 configured to remove samples that are known to be bad based on a quarantine list. A grouping subprocess 232 of the first pipeline is configured to group based on inherent grouping information already in the input dataset. A group-filtering subprocess 233 of the first pipeline may be a pass-through. Further, a sampling subprocess 234 of the first pipeline may perform random sampling without replacement with the group as the unit of sampling.

A normalization process 235 of the first pipeline may be configured to combine equal locations within a window of times to be a single location sample. Resolution of locations may be limited to a 10 meter grid in order to discretize the location space. Sample rate matching may be performed using random subsampling (without replacement) to equivalent numbers of samples per second to a gold-standard sampling rate. Further, random sampling without replacement (with the unit being groups from the grouping subprocess 232) may be matched to a wanted gold-standard ratio of groups with a given number of samples in them (after sample rate matching). For examples, it may be ensured that 20% of the resulting groups have 2 samples, 40% have three samples, and 40% have four samples. This may require gathering more location samples from the original dataset than that selected from the sampling subprocess 234 in order to generate the wanted ratios of groups with particular numbers of samples. Such an increase may be achieved by restarting the pipeline 230 with a larger target number of groups/samples for the sampling subprocess 234.

A metric subprocess 236 of the first pipeline may be configured to compute entropy over the location samples of each group, and create empirical distributions over the entropies created, where nats are discretized into 1-nat bins for the discrete empirical distribution. Further, the metric process may compute the KL-divergence between the empirical distribution over entropy and a gold-standard empirical distribution over entropy, and output this KL divergence from the first pipeline.

The second pipeline may include a grouping subprocess 232 that is configured to group all location samples into a single group. A sampling subprocess 234 of the second pipeline may perform random sampling without replacement with the location sample as the unit of sampling. A normalization process 235 of the second pipeline may be configured to combine equal locations within a window of times to be a single location sample. Resolution of locations may be limited in order to discretize the location space.

Sample rate matching may be performed using random subsampling (without replacement) to equivalent numbers of samples per second to a gold-standard sampling rate. Further, random sampling without replacement (with the unit being groups from the grouping subprocess 232) may be matched to a wanted gold-standard ratio of groups with a given number of samples in them (after sample rate matching). For examples, it may be ensured that 20% of the resulting groups have 2 samples, 40% have three samples, and 40% have four samples.

A metric subprocess 236 of the first pipeline may be configured to compute entropy over all location samples, and compute the total number of distinct users. The computed entropy may be divided by the distinct users to produce an average entropy per user, which is output from the second pipeline.

Further, to implement the Entropic Shift Metric the analysis application 150 may employ a metric distance/classifier process 220 configured as a classifier process. The classifier process receives a concatenation of the outputs from the two pipelines, represented as M_KLE=<kl,e>. A MAP classifier employing a Gaussian kernel density estimator 830 is used to map the pair of values to an estimated ratio of "bad" location samples to "good" location samples in the input dataset 160. The MAP classifier may perform the mapping based on labeled datasets 850 with possible ratios generated from a set of delta datasets 170. Each of the labeled datasets is mapped to a vector of values by processing them through the metric process 210. The output of the MAP classifier is a ratio of "bad" location samples to "good" location samples in the input dataset 160.

CONCLUSION

In summary, the above description details improved techniques that may be implemented in an analysis software application to measure a property of interest of a dataset of location samples (e.g., related to the dataset as a whole or of location samples within the dataset). It should be understood that the techniques and portions thereof may be utilized together, individually, or in combination with other techniques, depending on the implementation. Further, it should be understood that aspects of the techniques may be modified, added to, removed, or otherwise changed depending on the implementation. While specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory machine-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method for measuring a property of interest of an input dataset of location samples that each include an estimated location for an electronic device, comprising:
    determining, by a Wi-Fi positioning system (WPS) that utilize signals received from Wi-Fi access points (APs), a cellular positioning systems that utilize cellular signals received from cell towers, or a global positioning system (GPS) that utilizes signals received from satellites, estimated location for electronic devices;
    obtaining the input dataset of location samples that each include the estimated location for the electronic device, by an analysis application executing on a server;
    processing the input dataset, by the analysis application, to produce values that measure a metric for the input dataset, the measure of the metric indicating a spatio-temporal statistic or a relation to an existing dataset having known properties;
    generating, by the analysis application, labeled datasets of location samples that each include an estimated location for electronic devices, wherein the labeled datasets are each generated to have a different measure of the property of interest collectively covering a least a predetermined range and each have different values that measure the metric;
    comparing, by a classifier of the analysis application, the values that measure the metric for the input dataset with the values that measure the metric for each of the labeled datasets and based on the comparing, determining the measure of the property of interest for the input dataset; and
    returning the measure of the property of interest to a remote device.

2. The method of claim 1, wherein the generating further comprises:
    utilizing a feedback loop to repeatedly generate a labeled dataset with a different measure of the property of interest, until the values that measure the metric for the input dataset and the values that measure the metric for one of the labeled datasets are the same.

3. The method of claim 1, wherein the generating generates the labeled datasets by sampling from a plurality of delta data sets, the plurality of delta data sets including a first delta data set having a first measure of the property of interest and a second delta data set having a second, different measure of the property of interest.

4. The method of claim 1, wherein the processing utilizes one or more multi-stage pipelines that include at least a normalization phase that produces a normalized version of the input dataset, and a metric phase that produces the values that measure the metric using the normalized version of the input dataset.

5. The method of claim 4, wherein each multi-stage pipeline also includes a sampling phase, and the processing comprises:
    selecting from the input dataset a subset of location samples to be further processed, the selecting to perform at least one of random subsampling, deterministic subsampling, cluster based subsampling or model based sampling; and
    inferring the metric for the input dataset from the subset of location samples.

6. The method of claim 4, wherein each multi-stage pipeline also includes a grouping phase, and the processing the input dataset comprises:
    applying a grouping algorithm to group location samples from the input dataset into a plurality of groups; and
    measuring the metric at least in part by treating location samples that are members of the same group as comparable data samples.

7. The method of claim 4, wherein each multi-stage pipeline also includes a filtering phase, and the processing comprises:
    filtering the input dataset to produce a filtered dataset, the filtering to remove at least one location sample from the input dataset based on at least one of a quarantine list, device characteristics of the electronic device, a group that the location sample is a member of, or resolution of the location sample; and
    measuring the metric for the input dataset based on the filtered dataset.

8. The method of claim 4, wherein the normalization phase produces the normalized dataset using at least one of spatial normalization, temporal normalization or compositional normalization.

9. The method of claim 4, wherein the metric phase measures the metric for the input dataset by computing inherent spatio-temporal statistics of the location samples of the input dataset.

10. The method of claim 4, wherein the metric phase measures the metric for the input dataset by matching, clustering or feature comparing the location samples of the input data set with location samples of an existing dataset having known properties.

11. The method of claim 1, wherein the property of interest is location samples that have a particular property.

12. The method of claim 1, wherein the property of interest is location samples whose quality satisfies a quality threshold.

13. The method of claim 12, wherein the measure of the property of interest is a ratio of location samples that do not satisfy the quality threshold to location samples that satisfy the quality threshold.

14. The method of claim 1 wherein the property of interest is location samples that have at least one of diversity, entropy or information value that satisfies a respective threshold.

15. A method for measuring a property of interest of an input dataset of location samples that each include an estimated location for an electronic device, comprising:
 determining, by a Wi-Fi positioning system (WPS) that utilize signals received from Wi-Fi access points (APs), a cellular positioning systems that utilize cellular signals received from cell towers, or a global positioning system (GPS) that utilizes signals received from satellites, estimated location for electronic devices;
 obtaining the input dataset of location samples that each include the estimated location for the electronic device by an analysis application executing on a server;
 processing the input dataset using one or more multi-stage pipelines of the analysis application, the one or more multi-stage pipelines each including at least a normalization phase that produces a normalized version of the input dataset, and a metric phase that produces values that measure a metric using the normalized version of the input dataset;
 classifying, by a classifier of the analysis application, the input dataset based on a comparison of the values that measure the metric for the input dataset with values which measure the metric for a plurality of labeled datasets of location samples that each include an estimated location for electronic devices, wherein the labeled datasets are each generated to have a different measure of the property of interest collectively covering a least a predetermined range and each have a different measure of the property of interest;
 based on the classification, determine the measure of the property of interest for the input dataset; and
 returning the measure of the property of interest to a remote device.

16. The method of claim 15, comprising:
 utilizing a feedback loop to repeatedly generate a labeled dataset with a different measure of the property of interest, until the values that measure the metric for the input dataset and the values that measure the metric for the one of the plurality of labeled datasets are the same.

17. A non-transitory machine-readable medium storing software that when executed on hardware is operable to:
 determine based on Wi-Fi signals received from Wi-Fi access points (APs), cellular signals received from cell towers, or a global positioning system (GPS) signals received from satellites, estimated location for electronic devices;
 obtain an input dataset of location samples that each include an estimated location for an electronic device;
 process the input dataset to produce values that measure a metric for the input dataset, the measure of the metric indication a spatio-temporal statistic or a relation to an existing dataset having known properties;
 compare the values that measure the metric for the input dataset with values that measure the metric for labeled datasets of location samples that each include an estimated location for electronic devices, wherein the labeled datasets are each generated to have a different measure of the property of interest collectively covering a least a predetermined range and each have different measures of the property of interest;
 based on the comparison, determine the measure of the property of interest for the input dataset; and
 return the measure of the property of interest to a remote device.

18. The non-transitory machine-readable medium of claim 17, wherein the software is further operable to:
 utilize a feedback loop to repeatedly generate a labeled dataset with a different measure of the property of interest, until the values that measure the metric for the input dataset and the values that measure the metric for one of the labeled datasets are the same.

19. The non-transitory machine-readable medium of claim 17, wherein the software is further operable to:
 generate the labeled datasets by sampling from a plurality of delta data sets, the plurality of delta data sets including a first delta data set having a first measure of the property of interest and a second delta data set having a second, different measure of the property of interest.

20. The non-transitory machine-readable medium of claim 17, wherein the property of interest is location samples whose quality satisfies a quality threshold.

\* \* \* \* \*

UNITED STATES PATENT AND TRADEMARK OFFICE
CERTIFICATE OF CORRECTION

PATENT NO. : 10,902,025 B2  
APPLICATION NO. : 15/241928  
DATED : January 26, 2021  
INVENTOR(S) : Alizadeh-Shabdiz et al.

Page 1 of 1

It is certified that error appears in the above-identified patent and that said Letters Patent is hereby corrected as shown below:

In the Claims

Column 24, Line 14:  
Claim 17 reads:  
"indication a spatio-temporal statistic or a relation to an"  
Should read:  
--indicating a spatio-temporal statistic or a relation to an--

Signed and Sealed this  
First Day of March, 2022

Drew Hirshfeld  
*Performing the Functions and Duties of the  
Under Secretary of Commerce for Intellectual Property and  
Director of the United States Patent and Trademark Office*